United States Patent [19]
Larson

[11] Patent Number: 5,379,722
[45] Date of Patent: Jan. 10, 1995

[54] CONTROL FOR A MILKER UNIT SUPPORT

[75] Inventor: Larry G. Larson, Holmen, Wis.

[73] Assignee: Babson Bros. Co., Naperville, Ill.

[21] Appl. No.: 175,619

[22] Filed: Dec. 30, 1993

[51] Int. Cl.$^6$ .............................................. A01J 3/00
[52] U.S. Cl. .................................................. 119/14.1
[58] Field of Search ............... 119/14.08, 14.1, 14.11, 119/14.12, 14.13; 74/479 B, 479 H; 91/459; 901/17, 40

[56] References Cited

U.S. PATENT DOCUMENTS

| | | | |
|---|---|---|---|
| Re. 29,848 | 11/1978 | Schluckbier et al. | 119/14.08 |
| 2,613,636 | 10/1952 | Babson | 119/14.13 |
| 2,747,544 | 5/1956 | Thomas | 119/14.13 |
| 3,033,161 | 5/1962 | Babson | 119/14.13 |
| 3,094,099 | 6/1963 | Bertao | 119/14.54 |
| 3,605,694 | 9/1971 | Thomas et al. | 119/14.1 |
| 3,605,695 | 9/1971 | Thomas et al. | 119/14.1 |
| 3,624,739 | 11/1971 | Thomas | 119/14.1 |
| 3,760,956 | 9/1973 | Burch | 901/17 X |
| 3,861,355 | 1/1975 | Johnson et al. | 119/14.08 |
| 3,973,520 | 8/1976 | Flocchini | 119/14.08 |
| 3,999,518 | 12/1976 | Needham et al. | 119/14.13 |
| 4,652,204 | 3/1987 | Arnette | 901/17 X |
| 4,685,422 | 8/1987 | Middel et al. | 119/14.08 X |
| 4,936,255 | 6/1990 | Pera | 119/14.1 X |
| 5,042,428 | 8/1991 | Van der Lely et al. | 119/14.08 |

Primary Examiner—Gene Mancene
Assistant Examiner—Thomas Price
Attorney, Agent, or Firm—Wood, Phillips, VanSanten, Hoffman & Ertel

[57] ABSTRACT

A support for positioning a milker unit beneath a cow has a shaft which is vertically movably mounted on a base. An arm on the shaft supports a milker unit beneath a cow. Air pressure is applied to the shaft to hold the shaft and arm at a desired vertical position. A control automatically adjusts the vertical position of the support so that when the milker unit is attached to a cow's teats the weight of the milker unit is applied solely to the cow's teats. The control includes a pair of valves each connected to a supply of air under pressure. A first of the valves has an open position in which the amount of pressure applied to the support decreases and the support is permitted to lower. A second of the valves has an open position in which air from the supply moves the first valve from a normally closed position to the open position thereof. The control has a lever mounted on the arm for moving the second valve to the open position thereof when the milker unit applies force to the lever.

13 Claims, 1 Drawing Sheet

CONTROL FOR A MILKER UNIT SUPPORT

BACKGROUND OF THE INVENTION

1. Technical Field

This invention is a control for automatically adjusting the position of a support for a milker unit when a cow is milked.

2. Background Art

A milker unit draws milk from a cow's teats and is connected to a carry-away pipeline. Milk flow during milking is improved by applying the weight of a milker unit to a cow's teats to produce a positive or "live" action tug and pull on the teats. Apparatus for positioning a milker unit below a cow and providing a tug and pull effect is shown in Thomas U.S. Pat. Nos. 2,747,544, 3,605,694 and 3,605,695 and in Babson U.S. Pat. Nos. 2,613,636 and 3,033,161, all of which are assigned to the assignee of this application. The apparatus described in the above-identified patents hold a milker unit at a preset position below a cow during milking unless an operator adjusts the milker unit height.

Increasing slackness (or decreasing tautness) in a cow's udder during milking causes the height of a milker unit for achieving optimum tug and pull to change during the milking process. Specifically, a milker unit typically is connected to a support with a flexible member, such as a chain. Sag in a cow's teats during milking can cause the milker unit to lower so that the chain becomes taut and the weight of the milker unit is carried by the support rather than the cow's teats. A problem with prior apparatus in which a milker unit is held at a preset position is that the apparatus do not take into account the change in milker unit height required to apply continuously the weight of the milker unit to the cow's teats.

A support for automatically changing the position of a milker unit during milking is shown in commonly assigned Needham et al U.S. Pat. No. 3,999,518, issued Dec. 28, 1976. The Needham milker support has an electronic control for incrementally lowering a milker unit at equal time intervals during milking. A problem with the milker support described by Needham is that because the milker unit lowers at fixed time intervals and not as a direct function of force applied to the support, it is possible for at least a portion of the weight of the milker unit to be relieved from a cow's teats. For example, if the rate at which a cow's teats slacken exceeds the rate at which the control lowers the milker unit, the chain can become taut so that the weight of the milker unit is carried by the support. The chain also can become taut and the support similarly will carry the weight of the milker unit if the rate at which a cow's teats slacken is less than the rate at which the control lowers the milker unit.

SUMMARY OF THE INVENTION

A support for positioning a milker unit beneath a cow has a shaft vertically movably mounted on a base and an arm which extends from the shaft and is positionable beneath a cow. A milker unit is suspended from the arm by a chain. Air pressure is applied to the shaft to hold the shaft and arm at a desired vertical position. This invention is a control for automatically adjusting the vertical position of the arm so that the weight of the milker unit is continuously applied solely to the cow's teats.

The control includes a plurality of interconnected valves which cooperate to reduce air pressure on the shaft when the milker unit applies force to the arm. Reduced air pressure on the shaft permits the shaft and articulated arm to lower under their own weight until force is removed from the arm and the weight of the milker unit is carried by the cow's teats.

Particularly, a normally closed first valve is interconnected between the air supply and the shaft and has an open position in which pressure applied to the shaft is reduced and the shaft is permitted to lower. A second valve on the arm opens when the milker unit applies force to the arm and transmits a pilot pressure signal to open the first valve. A manual cut-out valve is provided for selectively deactivating the control. The control has an air chamber between the first valve and the shaft for providing a time delay after the first valve opens and before the control changes the position of the shaft and the arm to facilitate attachment of the milker unit to a cow.

DESCRIPTION OF THE PREFERRED EMBODIMENT

Figures 1, 2:
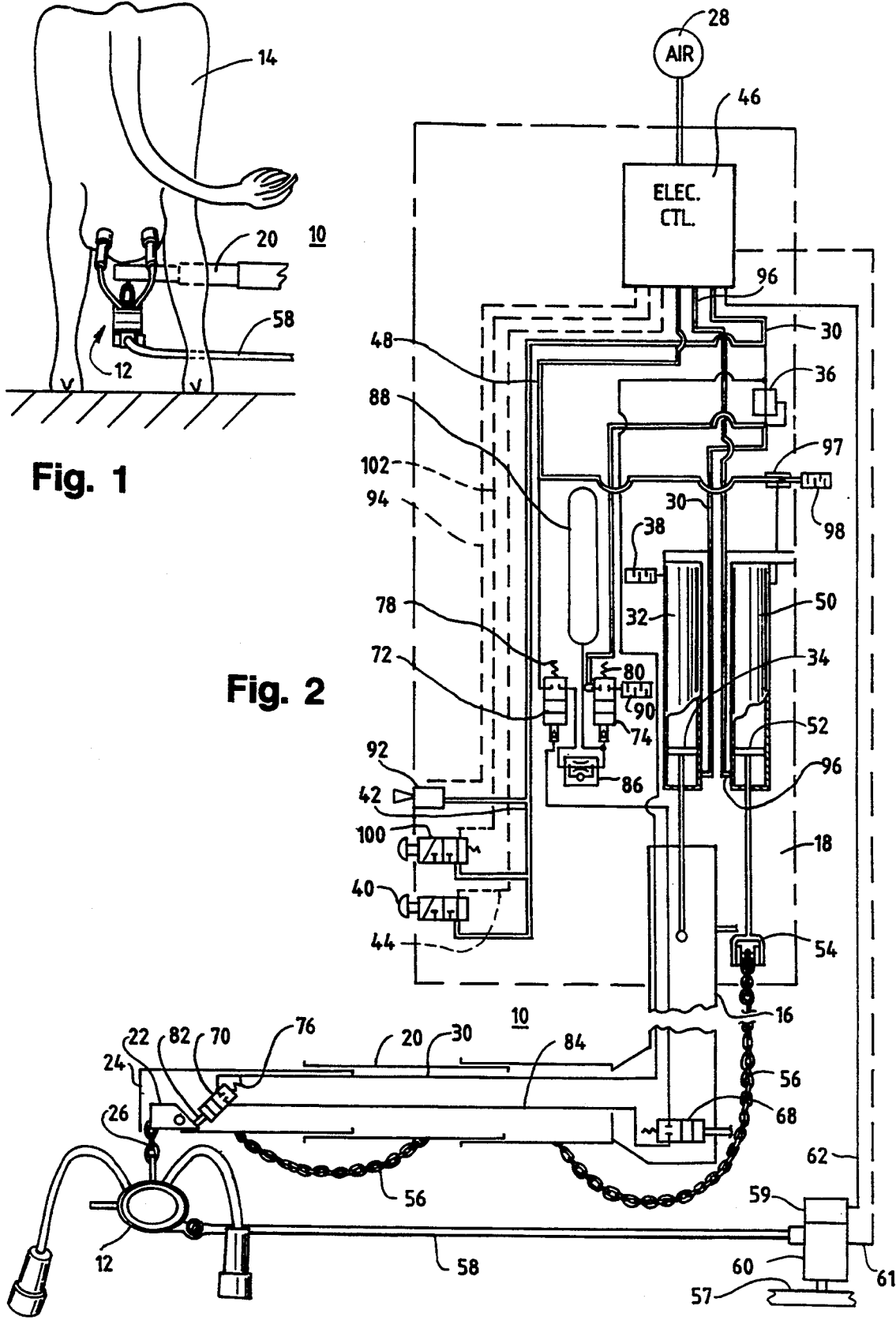
FIG. 1 is a diagrammatic illustration of a milker unit positioned beneath a cow.
FIG. 2 is a schematic drawing of a milker unit support control according to the present invention.

FIGS. 1 and 2 show a support 10 for positioning a milker unit 12 beneath a cow 14. The support 10 has a shaft 16 mounted for vertical movement on a base 18 and an articulated arm 20 extending from a lower end of the shaft 16. A lever 22 is pivoted to an end 24 of the arm 20 and the milker unit 12 is suspended from the lever 22 by a chain 26. Pressure from an air supply 28 holds the shaft 16 and the arm 20 at a desired vertical position.

Particularly, air from the supply 28 flows through a line 30 and into the lower end of a counterbalance cylinder 32 to apply pressure to the underside of a piston 34 connected to the shaft 16. A pressure regulator 36 in the line 30 maintains constant pressure in the counterbalance cylinder 32 for holding the piston 34 and the shaft 16 at a desired vertical position. The vertical position of the shaft 16 thus is manually adjustable over the range of motion of the piston 34. Air is displaced from the counterbalance cylinder 32 through a muffler 38 when the piston 34 moves upward.

A manually operated start valve 40 receives air from the supply 28 through a line 42 and selectively sends an air signal through a line 44 to an electronic control 46. The electronic control 46 permits air to flow from the supply 28 through a line 48 and into the upper end of a retract cylinder 50 to apply pressure to the upper side of a piston 52 connected to a clevis 54. A chain 56 is connected to the clevis 54 and to links of the articulated arm 20. Slack is provided in the chain 56 when the piston 52 and the clevis 54 lower so that the articulated arm 20 can be manually extended beneath a cow 14. At the start of milking, an operator actuates the start valve 40 and manually positions the milker unit 12 by vertically adjusting the shaft 16 and extending the articulated arm 20 beneath a cow. Regulated air pressure in the counterbalance cylinder 32 holds the shaft 16 at the desired vertical position.

The milker unit 12 is attached to a cow's teats after the shaft 16 is properly positioned. Vacuum in a pipeline 57 draws milks from the cow through a flexible hose 58 and a shut-off valve 59. The shut-off valve 59 has a flow sensor 60 electrically connected to the control 46 through a line 61 and receives air from the supply 28 through a line 62.

A control according to the present invention is shown schematically in the FIG. 2 and includes a plurality of interconnected valves 68, 70, 72 and 74 which, as described below, cooperate to reduce air pressure in the counterbalance cylinder 32 when the milker unit 26 applies force to the chain 26. Reduced air pressure in the counterbalance cylinder 32 permits the shaft 16 and articulated arm 20 to lower under their own weight until force is removed from the chain 26 and the weight of the milker unit 12 is carried by the cow's teats.

The valve 68 is a manual cut-out valve for selectively deactivating the present position control. When the cut-out valve 68 is manually closed, the valves 72 and 74 remain in a normally closed position regardless of the position of the valve 70. When the cut-out valve 68 is manually opened, the position of the valves 72 and 74 is established by the position of the valve 70.

That is, the valves 70, 72 and 74 are biased toward a normally closed position by springs 76, 78, and 80, respectively. Weight of the milking unit 12 on the chain 26 rotates the lever 22 which, in turn, depresses a trigger 82 to open the valve 70. The valve 70 receives air from the line 30 and directs a pilot pressure control signal along a line 84 to the valve 72 when the lever 22 rotates.

The valves 72 and 74 are interconnected between the line 48 and the line 30. Pilot pressure from the valve 70 and which exceeds the bias of the spring 78 opens the valve 72 to permit air in the line 48 to flow through a control valve 86 and toward the valve 74. Air which flows through the control valve 86 accumulates in a chamber 88 and supplies a pilot pressure control signal to the valve 74. The valve 74 opens when pilot pressure from the chamber 88 applies force which exceeds the bias of the spring 80. Air bleeds from the pressure regulator 36 through a muffler 90 when the valve 74 opens and reduces air flow to the counterbalance cylinder 32.

The shaft 16 and arm 20 lower under their own weight when air pressure in the counterbalance cylinder 32 decreases. The spring 76 closes the valve 70 and interrupts pilot pressure to the valve 72 when the support 10 is at height at which the weight of the milker unit 12 is not applied to the lever 22. The spring 78 then closes the valve 72 and terminates pilot pressure to the valve 74, and the spring 80 closes the valve 74 so that air pressure builds in the counterbalance cylinder 32 and holds the shaft 16 at the new position.

The chamber 88 provides a time delay after the milk valve 40 is actuated before the control changes the position of the shaft 16 and arm 20. Prior to attaching the milker unit 12 to the cow 14 the milker unit 12 is suspended from the arm 20 and the valve 70 is held open. Pilot pressure from the line 30 opens the valve 72 and connects the line 48 to the valve 74. However, since the line 48 is not pressurized until the milk valve 40 is actuated pilot pressure is not supplied to the valve 74. The time required to pressurize the volume of the chamber 88 after the line 48 is pressurized provides time to attach the milker unit 12 to the cow 14 after the milk valve 40 is actuated before the shaft 16 automatically lowers. In the exemplary embodiment the chamber 88 provides a time delay on the order of eight to ten seconds after the milk valve 40 is actuated before the control changes the position of the shaft 16 and arm 20.

A manual/automatic toggle valve 92 receives air from the supply 28 through the line 42 and selectively sends an air signal through a line 94 to the electronic control 46. In normal operation, the toggle valve 92 is placed in the automatic position so that when the cow 14 is milked out the 35 milker unit 12 is automatically detached from the cow's teats. More specifically, when the flow sensor 60 determines that flow through the hose 58 is low enough to indicate the cow 14 is sufficiently milked out, the sensor 60 signals the electronic control 46 to close the shut-off valve 59 and disconnect vacuum from the milker unit 12. The electronic control 46 then disconnects the air supply 28 from the upper end of the retract cylinder 50 and supplies pressure through a line 96 into the lower end of the retract cylinder 50 and against the underside of the piston 52. Air from the retract cylinder 50 is displaced through an exhaust valve 97 and a muffler 98 when the piston 52 moves upward. The clevis 54 draws the chain 56 upward and retracts the articulated arm 20. Continued upward movement of the piston 52 and clevis 54 draws the shaft 16 upward and displaces air in the counterbalance cylinder 32 through the muffler 38.

When the toggle valve 92 is in the manual position thereof detachment of the milker unit 12 is accomplished by operation of a manual detach valve 100. That is, in the manual position of toggle valve 92 the milker unit operates and remains attached to the cow 14 regardless of reduced milk flow until the toggle valve 92 is returned to the automatic position and the detach valve 100 is manually actuated.

The detach valve 100 receives air from the supply 28 through the line 42 and can selectively send an air signal through a line 102 to the electronic control 46. When the toggle valve 92 is returned to the automatic position thereof and the detach valve 100 is manually actuated the electronic control 46 closes the shut-off valve 59 and disconnect vacuum from the milker unit 12. The electronic control 46 then disconnects the air supply 28 from the upper end of the retract cylinder 50 and applies pressure against the underside of the piston 52. The clevis 54 draws the chain 56 upward and retracts the articulated arm 20. Continued upward movement of the piston 52 and clevis 54 draws the shaft 16 upward and displaces air in the counterbalance cylinder 32 through the muffler 38.

I claim:

1. In a support for positioning a milker unit beneath a cow, the support having
   a base,
   a shaft vertically movably mounted on the base,
   an arm extending from the shaft and being positionable beneath a cow,
   a supply of air under pressure, and
   means for applying pressure from said supply of air to hold the shaft at a desired position,
   an improved control for automatically adjusting the vertical position of the support so that the weight of the milker unit is continuously applied to the cow's teats, comprising:
   a first valve interconnected between the air supply and the shaft, the first valve being movable between a normally closed position and an open position, the first valve in the open position thereof decreasing pressure applied to said shaft whereby the shaft is permitted to lower;

a second valve interconnected between the air supply and the first valve, the second valve being movable between a normally closed position and an open position, the second valve in the open position thereof permitting air from the supply to move the first valve to the open position thereof; and means for mounting the second valve on the support so that force applied to the arm as by the weight of the milker unit moves the second valve to the open position thereof to lower the arm.

2. The control of claim 1 including a third valve connected between the first valve and the second valve, the third valve being manually movable between an open position and a closed position, the third valve in the closed position thereof preventing air from moving the first valve to the open position thereof regardless of the position of the second valve.

3. The control of claim 1 including time delay means for delaying the first valve from moving to the open position thereof after the second valve moves to the open position thereof.

4. The control of claim 1 in which the time delay is of the order of eight to ten seconds.

5. The control of claim 3 in which the time delay means comprises an air chamber interconnected between the first valve and the second valve, the first valve being biased toward said normally closed position thereof, air from said supply increasing pressure in the chamber when the second valve is in the open position thereof, pressure within the chamber causing said first valve to move to the open position thereof when said pressure exceeds the bias on the first valve.

6. The control of claim 1 including a fourth valve interconnected between the first valve and the second valve, the fourth valve also being connected directly to said air supply, the fourth valve being moved by air from said second valve from a normally closed position to an open position, the fourth valve in the open position thereof directing air from said supply to move the first valve to the open position thereof.

7. A support for positioning a milker unit beneath and connected to a cow's teats, comprising:
a base;
a shaft vertically movably mounted on said base;
an arm extending from the shaft and being positionable beneath a cow with the milker unit connected to the cow's teats;
a supply of air under pressure;
means for applying air pressure from said supply to hold the shaft at a desired vertical position; and a control for air pressure applied to said shaft, responsive to the application of weight by the milker unit to the arm, automatically adjusting the vertical position of the arm so that no weight of the milker unit is applied to the arm.

8. The support of claim 7 in which the control comprises a first valve interconnected between the air supply and the shaft, the first valve being movable between a normally closed position and an open position, and means responsive to the application of weight of the milker unit to the arm for moving the first valve to the open position thereof.

9. The support of claim 8 in which the control has a second valve interconnected between the supply of air and the first valve, the second valve being movable between a normally closed position and an open position when force is applied to the arm as by the weight of the milker unit, the second valve in the open position thereof permitting air from the supply to move the first valve to the open position thereof to lower the arm.

10. The support of claim 9 in which a lever is attached to the arm, a milker unit between connected to said lever, the lever being engaged with the second valve whereby the lever moves said second valve to the open position thereof when weight of the milker is applied to said lever.

11. A support for positioning a milker unit beneath a cow comprising:
a base;
a shaft vertically movably mounted on said base;
an arm extending from the shaft and being positionable beneath a cow;
counterbalance means for applying pressure to hold the shaft at a desired position; and
means cooperating with said counterbalance means for reducing said pressure when force is applied to the arm as by the weight of the milker, automatically adjusting the vertical position of the arm so that the weight of the milker unit is applied solely to the cow's teats.

12. The support of claim 11 including a supply of fluid under pressure, said counterbalance means comprising a valve interconnected between the fluid supply and the shaft, the valve being movable between a normally closed position and an open position, the valve in the open position thereof decreasing pressure applied to said shaft whereby the shaft is permitted to lower.

13. The support of claim 12 in which the valve is mounted on the support so that force applied to the arm moves the valve to the open position thereof to lower the arm.

* * * * *